United States Patent [19]

Coffman

[11] Patent Number: 4,782,432
[45] Date of Patent: Nov. 1, 1988

[54] MULTI-FUNCTION LIGHT
[75] Inventor: Stephen L. Coffman, New Gloucester, Me.
[73] Assignee: ME Generations Inc., Portland, Me.
[21] Appl. No.: 133,715
[22] Filed: Dec. 16, 1987

Related U.S. Application Data

[63] Continuation of Ser. No. 868,359, May 29, 1986, abandoned.

[51] Int. Cl.⁴ ............................................. F21L 7/00
[52] U.S. Cl. ................................... 362/184; 362/157; 362/171; 362/183
[58] Field of Search ............... 362/157, 171, 183, 184, 362/178

[56] References Cited

U.S. PATENT DOCUMENTS

| | | | |
|---|---|---|---|
| 3,953,768 | 4/1976 | Meredith et al. | 362/183 |
| 4,249,234 | 2/1981 | Park et al. | 362/184 |
| 4,268,894 | 5/1981 | Bartunek et al. | 362/183 |
| 4,321,657 | 3/1982 | Hoi | 362/184 |
| 4,384,317 | 5/1983 | Stackpale | 362/184 |
| 4,527,223 | 7/1985 | Maglica | 362/184 |
| 4,590,543 | 5/1986 | Chen | 362/183 |
| 4,605,993 | 8/1986 | Zelina, Jr. | 362/184 |
| 4,648,013 | 3/1987 | Curiel | 362/183 |

FOREIGN PATENT DOCUMENTS

| | | | |
|---|---|---|---|
| 0141455 | 5/1985 | European Pat. Off. | 362/157 |
| 2920299 | 11/1980 | Fed. Rep. of Germany | 362/157 |
| 3239489 | 4/1986 | Fed. Rep. of Germany | 362/183 |

Primary Examiner—Ira S. Lazarus
Assistant Examiner—Sue Hagarman
Attorney, Agent, or Firm—Curtis, Morris & Safford

[57] ABSTRACT

A multi-function portable illuminating device in which plural lamps, such as a spotlight, a fluorescent light and a strobe light, are disposed within a housing and are selectively connected to a rechargeable battery. The battery may be charged by conventional charging current generators which may be connected to a charging circuit within the housing or, alternatively, solar cells disposed within the housing may be used to supply a charging current to the battery. Advantageously, the housing is waterproof; and a remote switching device is used to select one of the lights for illumination. Preferably, the remote switching device is formed of plural magnetic reed switches and one or more magnets which may be moved to proximity with a selected one of the switches, thereby completing a circuit to a respective light.

9 Claims, 4 Drawing Sheets

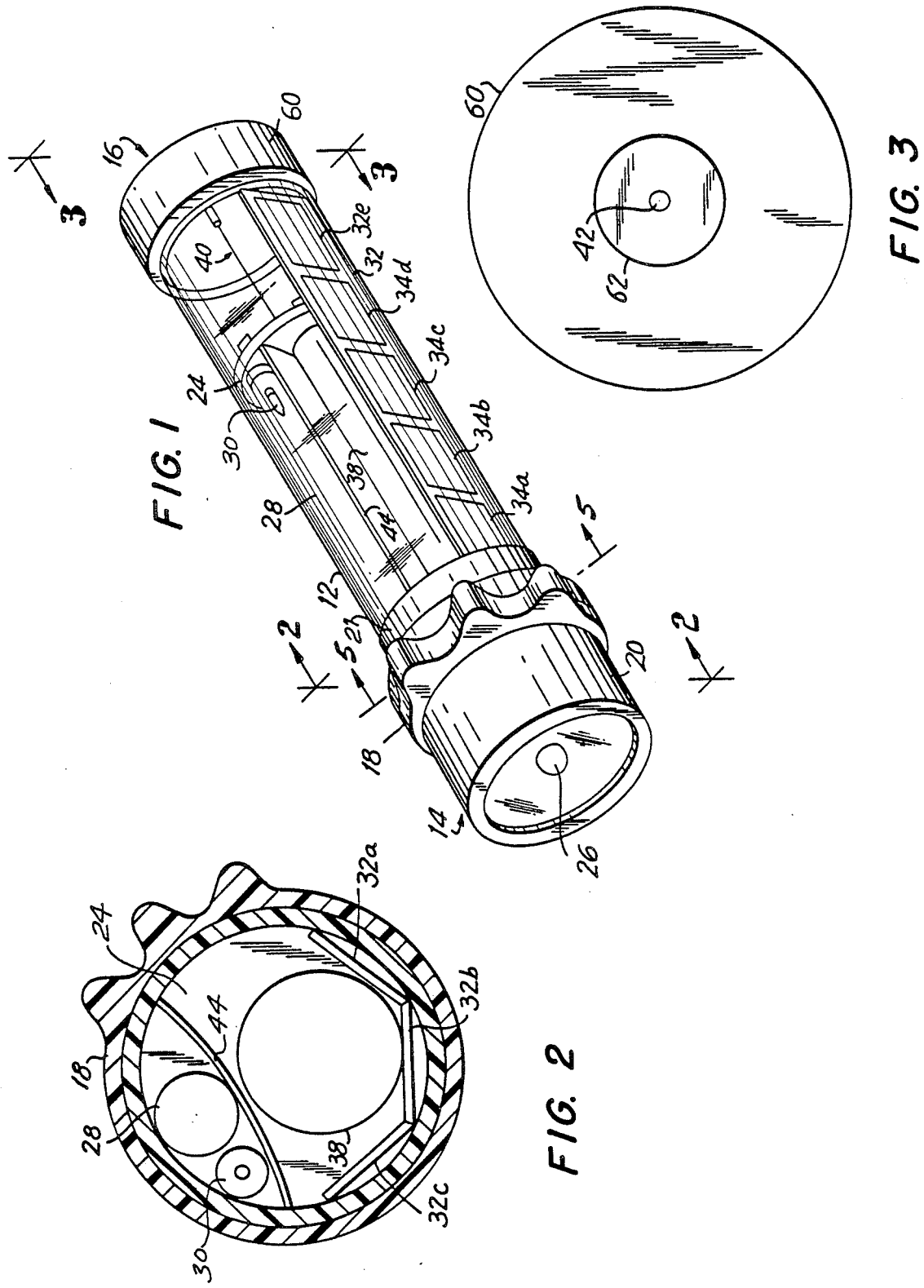

MULTI-FUNCTION LIGHT

This application is a continuation of application Ser. No. 868,359, filed May 29, 1986, now abandoned.

BACKGROUND OF THE INVENTION

This invention relates to a multi-function lamp and, more particularly, to such a lamp which is portable, which includes different lights, such as a spotlight, a fluorescent light and a strobe light, and which further includes a rechargeable battery that is connected to solar cells disposed within the lamp for recharging the battery.

Rechargeable flashlights are known in which a housing contains a spotlight that is electrically connected to a rechargeable battery. Typically, an external connector is provided on the light housing for coupling to a suitable source of recharging power, such as an electrical charging circuit, when the flashlight is not in use. In some flashlight devices, an additional light has been incorporated to supplement the spotlight effect. For example, a form of floodlighting is achieved by using a tungsten lamp formed of an elongated tube in combination with a diffusing lens. However, the power drain of such devices often is quite high; and the resultant flood-lighting intensity might not be adequate The aforementioned types of flashlights generally are designed for common everyday usage and, in the interest of economy, such devices usually are not waterproof. Flashlights which are intended for underwater applications are, of course, constructed of waterproof housing. However, such flashlights often include only a spotlight and, thus, exhibit somewhat limited utility. It is desirable to provide an additional light within the waterproof housing to achieve a floodlight effect; but, heretofore, such flashlight devices have not been readily available.

In addition to spot and floodlighting, a strobe light also is desirable for incorporation into a flashlight device. This is particularly true of flashlight devices that are intended for underwater applications. In the event of emergencies or when signalling is desired, the activation of a strobe light is quite advantageous. Here too, however, flashlight devices which include a high intensity strobe light have not been readily available.

While the use of rechargeable batteries in portable flashlight devices has been known for some time, recharging generally is achieved by an external charging circuit, such as via standard wall sockets. However, if electrical wall socket power is not available, the flashlight batteries are not easily recharged. This disadvantage can be reduced substantially by providing a charging circuit within the flashlight itself, thus permitting many readily available sources of charging current, such as manually operated generators (e. g. a so-called bicycle light generator), to be used. Still further, it is desired to utilize solar voltaic cells as a source of recharging current. Since sunlight is a plentiful source of energy, the use of such solar cells practically insures a fully recharged battery when standard utility-supplied power is not available.

Flashlight devices which are intended for underwater applications should be buoyant and designed to float. While some of these devices are sufficiently buoyant, it would be most helpful, particular in emergency situations, if they assumed predetermined orientations irrespective of the manner in which they are placed or dropped in a body of water. Specifically, if the flashlight device enjoys floodlight qualities, the device should assume a particular orientation to insure that the flood-lighting effect is visible.

OBJECTS OF THE INVENTION

Therefore, it is an object of the present invention to provide a multi-function portable illuminating device which exhibits all the advantageous features mentioned above, is relatively inexpensive to manufacture, is long-lasting and is durable.

Another object of this invention is to provide a light device of the type mentioned above which is waterproof, is capable of floating in a predetermined orientation, and is provided with a selector switching arrangement that is particularly resistant to corrosion and damage due to saltwater exposure.

A further object of this invention is to provide a light device of the type mentioned above which includes a spotlight, a fluorescent light and a strobe light, any one of which is individually selectable and powered from a single rechargeable battery.

An additional object is to provide a light device of the aforementioned type wherein the battery may be charged from an external charging source or from solar voltaic cells which are included in the device itself.

Yet another object of this invention is to provide a device of the aforementioned type which includes an AC generator powered from a rechargeable battery for driving either the fluorescent light or the strobe light, depending upon which of these lights is selected for use.

A still further object of this invention is to provide a light device of the aforementioned type which includes a battery check circuit which, when operated, provides quick and clear indications of the power operating level of the battery, thus apprising the user when a recharging operation is in order.

Various other objects, advantages and features of the present invention will become readily apparent from the ensuing detailed description, and the novel features will be particularly pointed out in the appended claims.

SUMMARY OF THE INVENTION

In accordance with one aspect of this invention, a multi-function portable illuminating device is provided with a rechargeable battery disposed within a (preferably waterproof) housing; and solar voltaic cells also are disposed within the housing. A connector (preferably female) provided on a rear portion of the housing is adapted to accept a male plug compatible therewith and coupled to an external source of charging current to supply charging current to the battery. The solar cells are connected to the battery and are adapted to function as a recharge source for the battery.

In accordance with another aspect of this invention, the device includes a spotlight, a fluorescent light and a strobe light, any one of which being selectively connected to the battery for energization. As one feature, one or more printed circuit boards are provided with electrical conductors for conducting current from the battery to the selected light. While conductors are provided on one surface of the printed circuit board, one or more solar voltaic cells are mounted on the opposite surface.

As another aspect of this invention, a remote switching arrangement is used to connect the selected light to the battery. Advantageously, this switching arrangement is comprised of plural magnetic reed switches fixedly secured within the housing and one or more magnetic elements mounted on an external movable support and positioned opposite a desired reed switch actuates that switch and thereby connects one of the lights to the battery. Preferably, the fluorescent light and the strobe light are AC powered; and an AC generator is mounted within the housing and selectively connected to the battery for supplying suitable AC power to the fluorescent light or to the strobe light.

As yet a further aspect of this invention, the battery is located offset from the longitudinal axis of the device housing, thus establishing the center of gravity for the device such that, if the device is disposed within a body of water, it assumes a predetermined orientation by which the strobe light and/or fluorescent light face upward and are readily observable from a distance. This is particularly useful in the event of emergency conditions.

In accordance with a still further aspect of this invention, a battery indicator is provided within the device housing and, when selected for operation, provides a clear and unambiguous indication of the power operating level of the battery.

In accordance with a further feature, the device of this invention is relatively simple to assemble. The housing thereof includes an end cap which retains a lens and a lens ring whose outer diameter is substantially equal to the inner diameter of the housing, the lens ring having an inner diameter that is substantially equal to the outer diameter of a conical reflector in which the spotlight is retained, whereby the reflector element is positioned in predetermined alignment, when assembled, to self-center the spotlight.

BRIEF DESCRIPTION OF THE DRAWINGS

The following detailed description, given by way of example and not intended to limit the present invention solely to the embodiment described herein, will best be understood in conjunction with the accompanying drawings in which:

FIG. 1 is a perspective view of the flashlight of the present invention, wherein several important elements included in the flashlight may be observed;

FIG. 2 is a sectional view taken along lines 2—2 of FIG. 1;

FIG. 3 is a sectional view taken along lines 3—3 of FIG. 1;

DETAILED DESCRIPTION OF A CERTAIN PREFERRED EMBODIMENT

Figure 4:
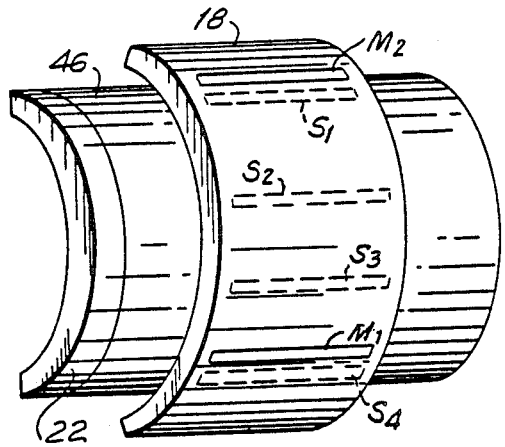
FIG. 4 is a partial perspective view of the selector switching arrangement incorporated within the present invention.

Referring now to the drawings, wherein like reference numerals are used throughout, and in particular to FIG. 1, there is illustrated a perspective view of a multi-function light 10 in which the various features of the present invention are found. The multi-function light preferably is a portable device formed of a waterproof, cylindrical tubular housing 12 constructed of suitable plastic materials, such as Lexan, or the like. All or portions of housing 12 are light transmissive, for a purpose soon to become apparent, and thus may be formed of clear or transparent plastic material. Although transparency is preferred, it is not essential to the present invention.

Housing 12 is provided with a forward end 14 and a rearward end 16. A front cap 20 is disposed at the forward end of the housing, this cap being secured to the housing by suitable means, such as a cement, by ultrasonic welding, or by screw threads. Front cap 20 is provided with a rotatable collar 18 which, during assembly, is slipped over the forward end of housing 12 and sandwiched between front cap 20 and a retaining ring 21, the latter being attached to housing 12. As will be described below, and particularly with respect to FIGS. 4 and 5, collar 18 is provided with one or more switch actuator elements for the purpose of selecting a particular function, depending upon the manual rotation of the collar with respect to cap 20.

A chassis formed of front and rear bulkheads 22 and 24 and, if desired, a support member that connects the bulkheads, is disposed within housing 12. Front bulkhead, or wall, 22 is shown more particularly in FIG. 5. Preferably, when the chassis is assembled within the housing, the bulkhead is located just rearwardly of front cap 20. Both bulkheads are adapted to have circuit boards secured thereto for the purpose of supporting and connecting various electrical circuit components, described in greater detail below. If desired, a refillable dessicant container (not shown) may be suitably secured within housing 12, as by mounting the container on one of the bulkheads. In addition, the front and rear bulkheads have sockets mounted thereon to receive various lamps. As shown in FIG. 1, a fluorescent light, or tube 28 is fixedly and electrically connected to suitable sockets (not shown) on the bulkheads. Also, a strobe light 30 may be connected to a socket mounted on rear bulkhead 24. Still further, a spotlight 26 is electrically connected to a suitable connector supported on bulkhead 22, and shown more particularly in FIG. 5, this spotlight being mounted in a reflector 58 (FIG. 6) which, in turn, is positioned within front cap 20.

The chassis formed of the front and rear bulkheads, the supporting members (if any) which extend therebetween, and various printed circuit boards (to be described) is secured to a rear cap 60, this chassis being inserted into cylindrical housing 12 from a rear opening thereof and brought into mechanical and electrical connection and alignment with front cap 20 and spotlight 26, as will be described.

Figure 5:
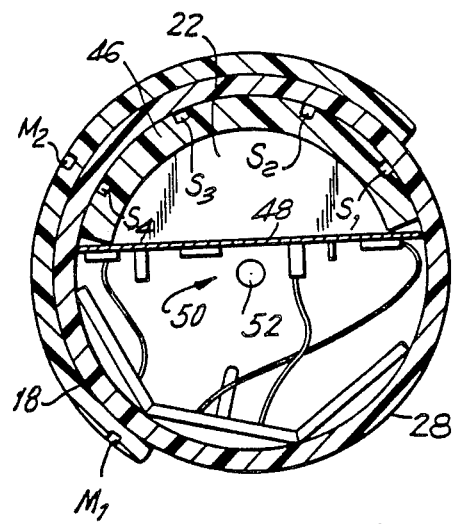
FIG. 5 is a front sectional view through the front cap of the present invention illustrating the selector switching arrangement, the solar voltaic cells, and other electrical aspects of the present invention.
Figure 7:
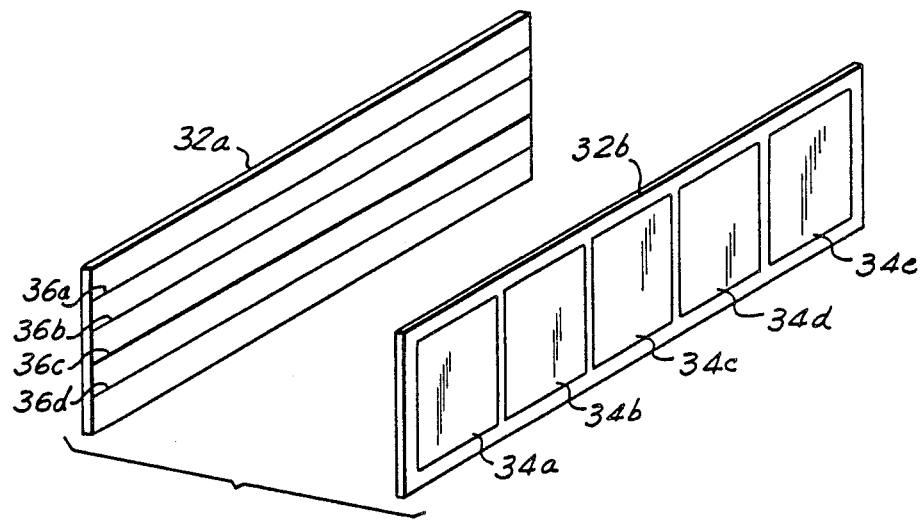
FIG. 7 is a perspective view of the printed circuit boards and solar voltaic cells which are used with the present invention.

Preferably, a plurality of printed circuit boards 32a, 32b and 32c are included within the aforementioned chassis, these printed circuit boards being shown in FIGS. 1, 2 and 5, and details of the printed circuit boards being shown in FIG. 7. As will be described below, each printed circuit board includes a surface on which several conductors 36, such as conductors 36a, 36b, 36c and 36d (FIG. 7), are secured. On the opposite surface of the printed circuit board are mounted individual panels 34a, 34b, 34c, 34d and 34e of solar voltaic cells. These photovoltaic cells may be connected in series and are adapted to generate an electrical current when exposed to sunlight or to another suitable source of light. Preferably, printed circuit boards 32a-32c are secured at one end to the front bulkhead and at the opposite end thereof to end cap 60. In an alternative embodiment the solar voltaic cells may be suitably mounted on the outer surface of housing 12.

A rechargeable battery 38, which may be of a conventional type such as nickel-cadmium, lead acid, or the like, is disposed within housing 12 and extends between suitable mechanical and electrical supporting connections at the front and rear bulkheads. For simplification, battery 38 is illustrated as a single rechargeable source of electrical power. It will be appreciated that, if desired, the battery may be formed of two, and preferably four, series-connected rechargeable cells. As a numerical example, if a nickel-cadmium battery is used, it may produce a voltage of about 5 to 5.5 volts. It is appreciated that other batteries may produce different voltage levels.

Suitable circuitry 40 is schematically represented in FIG. 1, this circuitry being mounted on rear bulkhead 24 and also on suitable supports, such as a printed circuit board, secured to or mounted on rear cap 60. Circuitry also is provided in front cap 20 and may be mounted on front bulkhead 22, as shown more particularly in FIG. 5 as circuitry 50. It will be appreciated that such circuitry may include suitable solid-state devices, such as transistors, integrated circuits, or the like. It also will be appreciated that discrete wires may be used to interconnect different portions of circuitry 40 and 50. Such wires are schematically represented in FIGS. 1 and 5.

As best shown in FIG. 3, a connector housing 62 projects outwardly from rear cap 60 for the purpose of supporting connector 42. This connector is formed as a jack adapted to be coupled to an external source of charging current. Examples of such external charging current sources include conventional AC charging devices adapted to be driven from conventional AC mains, 12 volt charging devices of the type normally used with automobiles, such as charging devices that are connected to the usual cigarette lighter socket of an automobile, a bicycle light generator of the type mentioned above, and a manually operable hand-crank generator that, when operated, may generate a DC charging current. If desired, connector housing 62 may be provided with external screw threads to which an adapter for use with the external source of charging current may be screwed. As an example, connector 42 may be formed as a coaxial connector with the central conductor being connectable to an external source of positive voltage and the surrounding coaxial conductor being connectable as the common-connected conductor.

As viewed along section lines 2—2 of FIG. 1, rotatable collar 18 is movable with respect to front cap 20 and functions as a selector switch, to be described. FIG. 2 illustrates the preferred interior configuration of various elements included within housing 12. A reflector 44 is secured to front and rear bulkheads 22 and 24 and, as particularly shown, is spaced from the axis of the tubular housing of fluorescent tube 28. Preferably, reflector 44 is an arcuate silverized mylar reflector and may form an integral portion of the chassis. It is, of course, appreciated that the portion of housing 12 which overlies fluorescent tube 28 is light transmissive and, preferably, is transparent.

Battery 38 is supported in the space beneath reflector 44, as illustrated in FIGS. 1 and 2. As mentioned above, the battery is a rechargeable battery and may be formed preferably of four cells. Although battery replacement might not be needed; nevertheless, it is anticipated that battery 38 may be removed by first removing rear cap 60, and a fresh battery then may be inserted. The axis of battery 38 is offset from the longitudinal axis of housing 12 to position the center of gravity of device 10 such that, if the device is dropped into a body of water, the device floats in a predetermined orientation by which the light emitted from fluorescent tube 28 is easily seen. FIG. 2 also illustrates a preferred arrangement of printed circuit boards 32a-32c each of which, as mentioned above and as shown more particularly in FIG. 7, is formed with conductors 36a-36d supported on one surface thereof and solar panels 34a-34e supported on the opposite surface thereof. It is recognized that, in the configuration shown in FIG. 2, solar cells 34a-34e are mounted on the outer surface of printed circuit boards 32a-32c; and housing 12 is light transmissive, and preferably transparent, to permit sunlight (or light from any other suitable source) to impinge upon the solar panels. Although three separate printed circuit boards are illustrated, it will be recognized that a lesser or greater number of such circuit boards may be used, as desired.

FIG. 2 also illustrates a preferred location of strobe light 30 within the space beneath reflector 44. As shown in FIG. 1, the strobe light preferably is supported on rear bulkhead 24, for example, by soldering the strobe light to a circuit board mounted on the rear bulkhead. As will be described below, a strobe drive circuit is electrically connected to strobe light 30 for the purpose of triggering the strobe light with a desired periodicity.

Preferably, strobe light 30 is constructed as a xenon strobe emitter and fluorescent tube 28 preferably is formed as a cold-fired fluorescent tube. Spotlight 26, although not shown in FIG. 2, preferably is constructed as a krypton incandescent lamp for the purpose of emitting a high intensity light beam.

Collar 18 is provided with at least one (and preferably two) magnetic elements, such as simple bar magnets, which may be supported on or embedded in the collar. As collar 18 rotates, the magnetic element (or elements) rotates therewith. The purpose of the magnetic element is to trigger a selected one of magnetic reed switches which are suitably supported on the chassis within housing 12 in the vicinity of front cap 20. When a particular reed switch is triggered under the influence of the magnetic force exerted thereon by the close proximity thereto of a magnetic element, a circuit is completed to energize either spotlight 26, fluorescent tube 28 or a battery check circuit 30. As will be described below, a strobe light circuit is included within device 10; and this circuit is energized when another magnetic reed switch is triggered under the influence of the magnetic element. Thus, rotatable collar 18 serves to select a desired function of device 10.

As shown more particularly in FIGS. 4 and 5, collar 18 is provided with two magnetic elements $M_1$ and $M_2$. The particular manner in which the magnetic elements are supported on or in collar 18 is not critical to the present invention. For example, suitable channels or recesses may be formed in collar 18; and magnetic elements $M_1$ and $M_2$ may be secured therein. Such magnetic elements may be cemented or coated with a suitable layer of epoxy such that they remain fixed within such channels. Alternative techniques of mounting or otherwise securing the magnetic elements to collar 18 may be adopted.

Preferably, a reed switch support 46 is secured to front bulkhead 22, as illustrated in FIGS. 4 and 5. It will be appreciated that, when the chassis is inserted into housing 12, support 46 extends into front cap 20 such that it is disposed concentrically within collar 18. In the preferred embodiment, four separate magnetic reed switches $S_1$, $S_2$, $S_3$ and $S_4$ are embedded into the outer surface of support 46, as best shown in FIGS. 4 and 5. It will be appreciated that magnetic reed switches $S_1$-$S_4$ may be mounted in and supported on support 46 in much the same way as magnetic elements $M_1$ and $M_2$ are mounted in and supported on collar 18. Thus, individual channels or recesses may be provided in support 46 to receive the reed switches which, in turn, may be cemented or epoxied thereto.

As best seen in FIG. 5, collar 18 is rotatably mounted behind front cap 20 and reed switch support 46 is mounted within the housing directly beneath the collar. Reed switches $S_1$-$S_4$ are supported on support 46; and magnetic elements $M_1$ and $M_2$ are supported on rotatable collar 18. For a purpose soon to be described, magnetic element $M_2$ is spaced from magnetic element $M_1$ such that, when element $M_1$ is disposed opposite reed switch $S_4$, element $M_2$ is concurrently disposed opposite reed switch $S_1$.

It is recognized that FIG. 5 is an end view of the interior of device 10, as seen from a section taken through front cap 20 along lines 5—5. Front bulkhead 22 may support reed switch support 46 and additionally supports a printed circuit board 48. Various circuit elements, generally identified by reference numeral 50, are supported on circuit board 48, some of these circuit elements being described below. In addition, a spotlight connector 52 preferably passes through front bulkhead 22 and is positioned coincident on the longitudinal axis of the chassis and of housing 12 and is connected to battery 38. Connector 52 may be similar to conventional flashlight connectors which establish current paths to the usual flashlight bulbs. The purpose of spotlight connector 52 is to provide an electrical connection to the krypton incandescent bulb which is used as spotlight 26.

Figure 6:
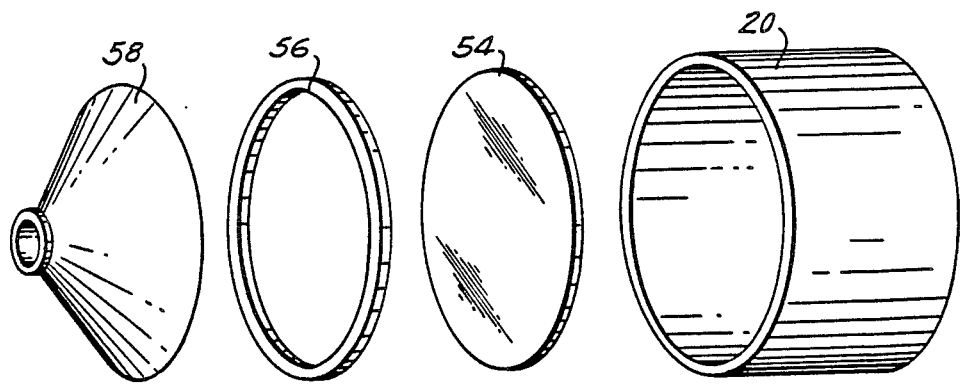
FIG. 6 is an exploded perspective view illustrating the self-centering feature by which the spotlight is retained in this invention.

FIG. 6 is a perspective view representing the self-centering arrangement by which the spotlight, together with its reflector, is assembled within front cap 20. A lens 54, which may be formed of suitable plastic material, has an outer diameter that is substantially equal to the inner diameter of front cap 20. Lens 54, during assembly, is inserted into the front cap and is suitably sealed therein to provide a waterproof seal. A lens ring 56 then is inserted into front cap 20 and abuts against lens 54. The outer diameter of lens ring 56 preferably may be substantially equal to the inner diameter of housing 12 and, if desired, the lens ring also may be sealed to the lens. Then, a conical reflector 58, which may be formed of polished aluminum or formed of other material having a silverized mylar coating thereon, is positioned within the lens ring. The outer diameter of reflector 58 is substantially equal to the inner diameter of lens ring 56 and, thus, reflector 58 is centrally aligned within cap 20 such that its axis coincides with the longitudinal axis of the cap and, thus, the longitudinal axis of housing 12 (not shown). Preferably, the krypton incandescent bulb is suitably supported within reflector 58 such that its electrical connecting portions will be brought into physical and electrical contact with connector 52 (FIG. 5) when the chassis is inserted into housing 12. Thus, the spotlight assembly is self-centered along the longitudinal axis of the housing.

Before describing some of the circuits included in device 10 and the manner in which this device operates, a brief explanation is provided regarding the assembly of the overall light. A subassembly formed of lens 54 and lens ring 56 may be of one piece construction or the lens and lens ring may be bonded together. This subassembly is then joined to housing 12 so that the lens ring 56 is inside the housing and faces the rear of the light. Collar 18, with a detent mechanism (described below), is then slipped over the front of housing 12 and pushed toward retaining ring 21 against spring pressure. While collar 18 is thus held, front cap 20 is slipped over the exposed front stub of housing 12 and secured thereto by cement, ultrasonic welding or the like. Reflector 58 is then lowered into the housing, and under the influence of gravity reaches lens ring 56 where the forward flange of reflector 58 (not shown) is automatically self centered inside the lens ring diameter. Collar 18 and retaining ring 21 contain notches in their opposing faces (not shown) to prevent collar rotation beyond positions which, as will be described, are designated "off" and "4". Then, the chassis comprised of front and rear bulkheads 22 and 24, together with fluorescent tube 28, strobe light 30, printed circuit boards 32a–32c, battery 38, cylindrical reflector 44 and, if desired, an additional longitudinal support is inserted into housing 12. Preferably, rear cap 60 is secured to this chassis, as by securing the rear cap to rear bulkhead 24. Although not shown, the inner surface of rear cap 60 preferably is provided with screw threads which mate with screw threads provided on the inner surface of the rear portion of housing 12. As the chassis is inserted into the cylindrical tubular housing, rear cap 60 is brought into contact with the screw threads on the housing. Rear cap 60 then is rotated, which results in the rotation of the chassis relative to housing 12. As a result, rear cap 60 is screwed to housing 12; and spotlight connector 52 is brought into physical and electrical contact with the krypton incandescent bulb comprising spotlight 26. Hence, the chassis is fitted properly within the housing; and the rear cap is secured in water-tight relationship to the rear portion of housing 12. Other fittings, such as bayonet-type fittings, may be used to secure the rear cap to the housing.

It is recognized that, as rear cap 60 rotates, the chassis connected thereto also rotates, resulting in a corresponding rotation of reed switch support 46. Since magnetic reed switches $S_1$-$S_4$ are mounted on support 46, it is important that such reed switches be aligned properly within housing 12 so that desired ones may be actuated to select desired functions as collar 18 having magnetic elements $M_1$ and $M_2$ mounted thereon is rotated. Preferably, a suitable reference mark (not shown) may be provided on housing 12, this reference mark being aligned with a predetermined element of the chassis, such as an edge portion of one of the printed circuit boards, such alignment representing proper alignment of the chassis and, thus, proper alignment of support 46 with respect to collar 18.

Desirably, the inner surface of collar 18 and an opposite, facing surface of front cap 20 or retaining ring 21 are provided with a detent mechanism (e.g. a spring-loaded ball and positioning notches) by which the collar may be rotated to predetermined positions relative to the front cap and to housing 12. These positions may be designated as "off", "1", "2", "3" and "4" when the collar is rotated in one direction or, alternatively, "4", "3", "2", "1" and "off" if the collar is adapted to be rotated in the opposite direction. In the the "off" position, neither magnetic element $M_1$ nor magnetic element $M_2$ is aligned opposite a reed switch. In position "1", magnetic element $M_2$ is juxtaposed reed switch $S_4$. In position "2", magnetic element $M_2$ is juxtaposed reed switch $S_3$. In position "3", magnetic element $M_2$ is juxtaposed reed switch $S_2$. Finally, in position "4", magnetic element $M_2$ is juxtaposed reed switch $S_1$ and, concurrently, magnetic element $M_1$ is juxtaposed reed switch $S_4$. It is seen, therefore, that the angular separation between magnetic elements $M_1$ and $M_2$ is substantially equal to the angular separation between reed switches $S_4$ and $S_1$. As will be described below, the fluorescent tube is energized when collar 18 is rotated to position "1". The spotlight is energized when the collar is rotated to position "2". A battery check circuit is energized to provide an indication of the power operating level of battery 38 when collar 18 is rotated to position "3". Finally, the strobe light is triggered when collar 18 is rotated to position "4".

Figure 8:
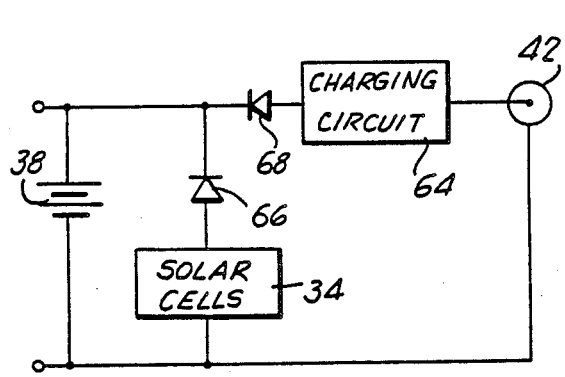
FIG. 8 is a partial block, partial schematic view of the battery charging arrangement used by the present invention.

Turning now to FIG. 8, there is illustrated a schematic diagram representing the manner in which battery 38 may be charged either by solar voltaic cells 34 or by an external source of charging current that may be connected to connector 42 provided on rear cap 60. As illustrated in FIG. 8, solar voltaic cells 34, which are shown in FIG. 7 as comprising solar cells 34a-34e on each of printed circuit boards 32a-32c, are connected in series; and this series circuit is, in turn, connected by a diode 66 in parallel with battery 38. Thus, upon being exposed to sunlight or any other suitable light source, a charging current is generated by solar cells 34, and this charging current is supplied by diode 66 to charge battery 38.

Connector 42 is coupled to a charging circuit 64, which may be of conventional construction, and is adapted to supply electrical power to the charging circuit from an external power source that may be connected to connector 42. Examples of such external power sources have been described above. As is conventional, charging circuit 64 responds to the energy supplied thereto to generate a charging current; and this charging current may be supplied by way of a diode 68 to battery 38. Diodes 66 and 68 are poled such that current generated by solar cells 34 is blocked by diode 68 from affecting charging circuit 64. Similarly, a charging current that is generated by charging circuit 64 in response to the voltage and current supplied thereto from the external power source that may be connected to connector 42, is blocked by diode 66 from affecting solar cells 34. Thus, charging circuit 64 does not present an electric drain to solar cells 34.

It will be appreciated that, in view of the particular circuit connections illustrated in FIG. 8, there is no need to provide a separate reed switch to select a battery charging operation. Rather, such battery charging will occur inherently whenever solar cells 34 are energized or, alternatively, whenever a suitable external source of power is connected to connector 42.

Preferably, charging circuit 64 is provided on rear bulkhead 24; and various ones of conductors 36a-36d of printed circuit board 32a or 32b or 32c are used to connect the charging circuit and diode 68 to battery 38. Likewise, different conductors may be used to connect solar cells 34 and diode 66 across the battery. DC current thus may flow from one end of the printed circuit board to the other depending upon the particular locations of the respective circuits, by means of the conductors which are supported on the printed circuit boards.

Figure 9:
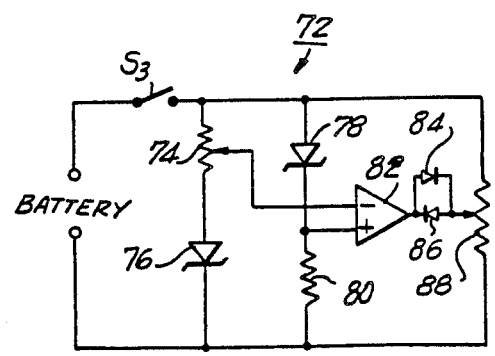
FIG. 9 is a schematic illustration of the battery check circuit used with the present invention.

Referring now to FIG. 9, there is illustrated a schematic diagram of one embodiment of a battery check circuit 72 which may be used with light device 10 of the present invention. The various components of the battery check circuit may be disposed on either of front or rear bulkheads 22 and 24, as desired.

Battery check circuit 72 is comprised of a variable resistor 74, such as a potentiometer, zener diodes 76 and 78, a resistor 80, a differential amplifier 82 and light-emitting devices (LED's) 84 and 86. The battery check circuit is adapted to be connected across battery 38 by means of magnetic reed switch $S_2$. As will be described below, when magnetic element $M_2$ is juxtaposed reed switch S2 by reason of the rotation of collar 18, the reed switch closes to connect the battery circuit across battery 38. Variable resistor 74 is connected in series with zener diode and this series circuit is connected in parallel with another series circuit formed of zener diode 78 and resistor 80. These parallel-connected circuits are adapted to be connected across battery 38 upon the actuation, or closure, of switch $S_2$. Preferably, the cathode of zener diode 76 is coupled directly to the negative terminal of battery 38, and one terminal of variable resistor 74 is coupled via switch to the positive terminal of the battery. The anode of zener diode 78 preferably is coupled by switch $S_2$ to the positive terminal of battery 38 and a terminal of resistor 80 is connected directly to the negative terminal of tne battery.

Differential amplifier 82 may be a conventional amplifier having an inverting input connected to the adjustable contact of variable resistor 74 and a non-inverting input connected to the junction defined by the cathode of zener diode 78 and the other terminal of resistor 80. The output of amplifier 82 is connected in series with parallel-connected, oppositely poled LED's 84 and 86 to the adjustable contact of a variable resistor 88 connected across battery 38.

As a numerical example, let it be assumed that, when battery 38 is properly charged, it provides an output voltage level of about 5.3 volts. Let it be further assumed that the forward voltage drop of zener diode 76, when conducting, is on the order of about 0.3 volts. The forward voltage drop Of zener diode 78 also is on the order of about 0.3 volts, during conduction. The adjustable contact of variable resistor 74 is positioned such that, when the battery is properly charged to provide an output voltage of about 5.3 volts, the voltage applied to the inverting input of differential amplifier 82 is on the order of about 2.5 volts.

In accordance with the foregoing numerical example, let it be assumed that battery 38 is properly charged and that switch $S_2$ is closed. The voltage produced by the battery is assumed herein to be on the order of about 5.3 volts, resulting in the conduction of zener diode 76 and a voltage at the inverting input of differential amplifier 82 on the order of 2.5 volts. Zener diode 78 also conducts, and the voltage applied from the cathode of this zener diode to the non-inverting input of the differential amplifier is on the order of about 5 volts. Accordingly, differential amplifier 82 produces a positive output voltage sufficient to render LED 84 conductive and to render LED 86 non-conductive. The conductivity of LED 84 results in a visual indication that battery 38 is of a sufficient power operating level to drive spotlight 26 or fluorescent tube 28 or strobe light 30.

Let it now be assumed that the power operating level of battery 38 has dropped below a threshold sufficient to drive any of the illuminating lamps included in device 10. As an example, let it be assumed that the voltage produced by the battery is on the order of about 4.9 volts. When switch $S_2$ is closed, the voltage now applied across resistor 74 is about 4.6 volts, and the voltage applied to zener diode 76 is not sufficient to overcome its forward breakdown threshold voltage. Consequently, current does not flow through resistor 74 and, thus, the adjustable contact thereof supplies to the inverting input of differential amplifier 82 a voltage substantially equal to the battery voltage (e.g. a voltage on the order of about 4.9 volts). Now, however, the voltage produced at the junction defined by the cathode of zener diode 78 and resistor 80 is on the order of about 4.6 volts (it is assumed that the battery voltage exceeds the forward breakdown voltage and it is recalled that the forward voltage drop of zener diode 78 is on the order of about 0.3 volts). Since the voltage at the inverting input of the differential amplifier now exceeds the voltage at the non-inverting input thereof, a negative voltage is produced at the output of differential amplifier 82, and this negative voltage renders LED 86 conductive and LED 84 non-conductive. As a result of the conduction of LED 86, a visual indication is provided to apprise the user that the power operating level of battery 38 now is not sufficient to energize any of the illuminating lamps of device 10. It is expected that the user now will charge the battery, either by exposing solar cells 34 to sunlight or to another suitable source of light; or by connecting an external source of charging current to connector 42. The use of adjustable resistor 74 permits varying degrees of sensitivity to this battery check circuit, as may be desired.

Figure 10:
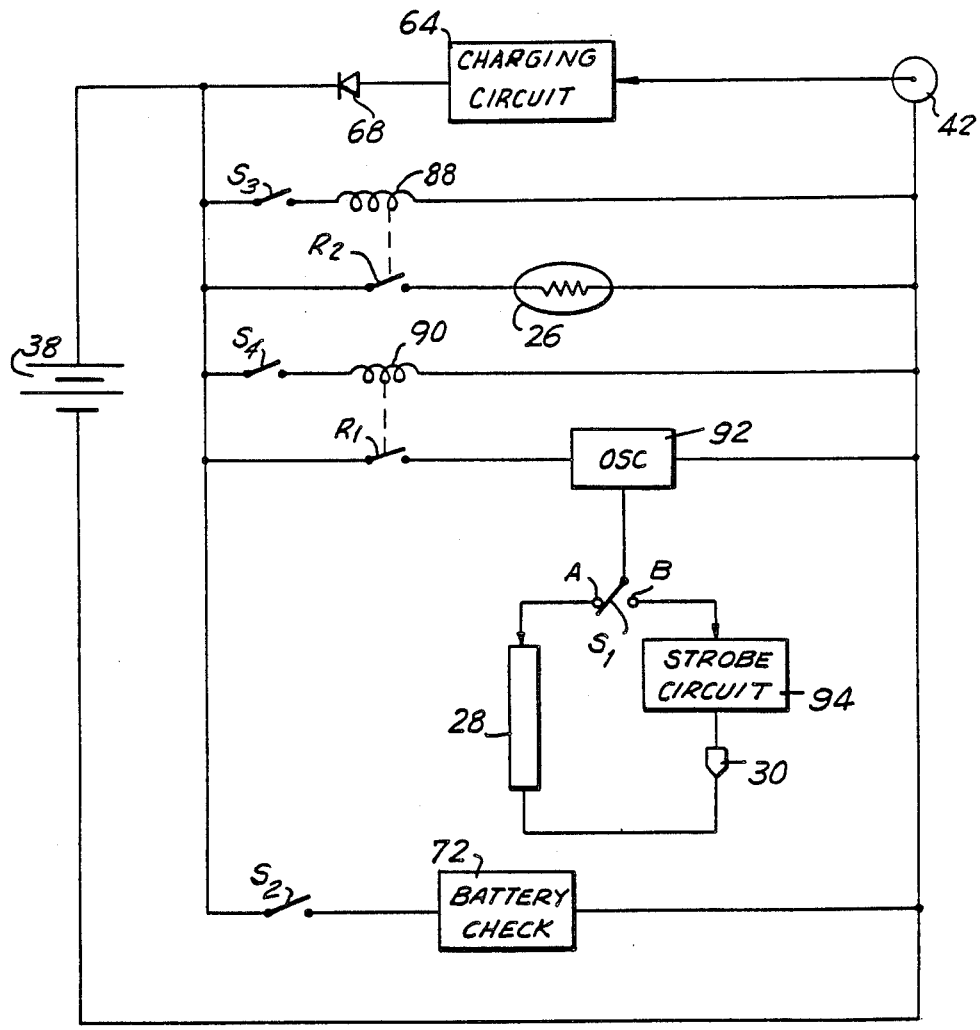
FIG. 10 is a schematic diagram of the manner in which different functions of the present invention are selected for operation.

As mentioned previously, the rotation of collar 18 to selected angular positions results in the alignment of magnetic elements $M_1$ and $M_2$ with selected ones of magnetic reed switches $S_1$-$S_4$. Depending upon the particular switch with which each magnetic element is juxtaposed, a respective function of light device 10 is selected. As mentioned previously, when magnetic element $M_2$ is juxtaposed switch $S_4$, fluorescent tube 28 is energized. When magnetic element $M_2$ is juxtaposed reed switch $S_3$, spotlight 26 is energized. When magnetic element $M_2$ is juxtaposed reed switch $S_2$, battery check circuit 72 (FIG. 9) is connected across battery 38, as just described. Finally, when magnetic element $M_2$ is juxtaposed reed switch $S_1$ and magnetic element $M_1$ is concurrently juxtaposed reed switch $S_4$, strobe light 30 is energized. The manner in which these different functions are selected is represented by the schematic diagram of FIG. 10.

As shown, battery 38 is connected to charging circuit 64 which, in turn, is coupled to connector 42, as described previously in conjunction with FIG. 8. A first switching circuit comprised of magnetic reed switch $S_4$ in series with a relay energizing coil 90 is connected across the battery. In parallel with this circuit is yet another circuit comprised of relay contacts $R_1$ in series with an oscillating circuit 92. It is appreciated that, when current flows through relay coil 90, relay contacts $R_1$ are closed. Oscillating circuit 92 may comprise a conventional oscillating device, such as a stable oscillator or other suitable AC generator powered from a DC source. It is, of course, appreciated that the DC source used herein for the purpose of driving oscillator 92 is battery 38.

Yet another circuit connected across battery 38 is comprised of magnetic reed switch $S_3$ connected in series with a relay energizing coil 88. In parallel with this circuit is yet another circuit comprised of relay contacts $R_2$ and spotlight 26. It is appreciated that, when current flows through relay coil 88, as when switch $S_3$ is closed, relay contacts $R_2$ close to supply DC current through the spotlight, thereby energizing spotlight 26.

Yet another circuit across battery 38 is comprised of magnetic reed switch $S_2$ and battery check circuit 72. This additional circuit has been described previously in conjunction with FIG. 9 and further description thereof need not be provided here.

Oscillating circuit 92 is provided with AC terminals, only one of which is shown. The AC power generated by the oscillating circuit is used to energize either fluorescent tube 28 or strobe light 30. Magnetic reed switch $S_1$ preferably is formed as a single pole, double throw switch having fixed contacts A and B. When in one condition, the movable contact of switch $S_1$ engages fixed contact A to connect fluorescent tube 28 to the AC output terminals of oscillating circuit 92. However, when switch $S_1$ is actuated to assume another condition, its movable contact engages fixed contact B to connect strobe circuit 94 to the AC output terminals of oscillating circuit 92. The strobe circuit may comprise a suitable monostable multivibrator or other conventional circuit which generates a periodic pulse, and the output of strobe circuit 94 is connected to strobe light 30. Thus, with each strobe pulse produced by the strobe circuit, strobe light 30 is energized to emit a pulse of light.

As mentioned above, in the preferred embodiment collar 18 rotates from an "off" position to positions "1", "2", "3" and "4", as desired. When collar 18 is rotated from its "off" position to position "1", magnetic element $M_2$ is juxtaposed magnetic reed switch $S_4$, thus closing this reed switch. As a result, current flows from battery 38 through closed reed switch $S_4$ to energize relay coil 90. consequently, relay contacts $R_1$ close to couple oscillator 92 across battery 38. As a result, oscillator 92 generates C power which is supplied through reed switch $S_1$ (whose movable contact here is in engagement with fixed contact A) fluorescent tube 28. Thus, in position "1", fluorescent tube 28 is energized.

If collar 18 now is rotated to position "2", magnetic element $M_2$ is juxtaposed magnetic reed switch $S_3$. As a result, switch $S_3$ closes to supply current to relay energizing coil 88. This energization of the relay coil closes relay contacts $R_2$ to connect spotlight 26 across battery 38. The spotlight thus is energized.

If collar 18 now is rotated to position "3", magnetic element $M_2$ is juxtaposed magnetic reed switch $S_2$. As a result, this switch closes to connect battery check circuit 72 across battery 38. Depending upon the power operating level of the battery, a suitable visual indication is provided. This has been discussed above in conjunction with the schematic diagram shown in FIG. 9.

If collar 18 now is rotated to position "4", magnetic element $M_2$ is brought into juxtaposition with magnetic reed switch $S_1$ and, concurrently, magnetic element $M_1$ is juxtaposed magnetic reed switch $S_4$. As before, the closing of switch $S_4$ connects oscillating circuit 92 across battery 38. Now, however, the actuation of switch $S_1$ changes over this switch to its second condition whereby the movable contact thereof engages contact B. Oscillating circuit 92 now supplies AC power to strobe circuit 94 which in turn, triggers strobe light 30 periodically.

It is appreciated that some functions of light device 10 require higher currents than other functions. For example, spotlight 26 draws a higher current than does fluorescent tube 28. Similarly, oscillating circuit 92 draws a higher current than battery check circuit 72. To accommodate these higher currents, it is preferred that one of the conductors disposed on each of printed circuit boards 32a–32c be of a higher current carrying capacity than the others. This is depicted in FIG. 7 wherein conductor 36c is seen to be thicker than the other conductors.

While the present invention has been particularly shown and described with reference to a preferred embodiment, it will be readily appreciated by those of ordinary skill in the art that various changes and modifications may be made without departing from the spirit and scope of the invention. Some of these changes and modifications have been been suggested above. For example, it is appreciated that various ones of the circuits shown and described herein may be disposed on one or the other of bulkheads 22 and 24. By reason of the electrical interconnections between circuit elements on respective bulkheads via conductors 36 of printed circuit boards 32, a portion of a particular circuit may be disposed on one bulkhead and the remainder of that circuit may be disposed on the other. It is recognized that simplicity of manufacturing and ease of assembly may determine, in part, the particular locations of various circuit components.

It also is appreciated that, while collar 18 preferably is rotatably mounted on or adjacent front cap 20, this rotatable collar may be located at any desired location along device 10. The magnetic reed switches will, of course, be disposed opposite the magnetic elements mounted on the collar. As an alternative, however, rotatable collar 18 may be replaced by a longitudinal slider on which magnetic elements $M_1$ and $M_2$ are mounted; and magnetic reed switches $S_1$–$S_4$ may be arranged in a linear array beneath this slider and individually actuated by the magnetic elements. As yet another alternative, although two magnetic elements have been proposed, it is appreciated that, if desired, only a single magnetic element may be used together with an additional magnetic reed switch. As a still further embodiment, other proximity sensing devices may be used in place of the magnetic reed switches and magnetic elements described herein. For example, Hall effect devices may be used, although such devices are known, at the present time, to draw current from, for example, battery 38 even in their quiescent modes. Still further, a position detector may be used to sense the angular position of collar 18 (or the longitudinal position of the above-mentioned slider) and to produce a plural bit digital signal representative thereof. This plural bit digital signal may cause the selected energization of a desired one of the above-mentioned functions of light device 10.

Still further, although not described herein, a suitable handle or sling may be mounted or fitted to the exterior of housing 12 for ease of carrying light device 10.

It also is contemplated that those portions of housing 12 through which light need not pass may be opaque or, if desired, means may be provided thereon (e.g. a decorative covering, an external shell, or the like) to block light. Preferably, housing 12 is constructed of a suitable plastic material, as mentioned above.

Since rechargeable battery 38 provides an adequate source of electric power, accessory devices, external to light 10, may be electrically connected to the battery to be powered thereby. Connector housing 62, which projects outwardly from rear cap 60 for the purpose stated herein of providing an electrical connection to an external source of charging current, also can be used to electrically connect an accessory device to battery 38. An additional switch or current steering circuit may be provided to disconnect charging circuit 64 and diode 68 between the battery and connector 42 and, in place thereof, simply connect the battery directly to the connector, or steer current from the battery to the connector, so as to power the accessory device coupled to connector 42. Examples of accessory devices that can be powered by battery 38 include garments containing electrical heating coils, such as an electrically heated vest, boot or glove, ultraviolet emitting devices, or the like.

Also, an extension cable may be connectable at one end to connector 42 and at its other end to an electrical charging source, such as an automotive battery, a gasoline engine-driven alternator (such as found in conventional vehicles) or the like.

It is intended that the appended claims be interpreted as including the particular embodiments described herein, the foregoing suggested changes and modifications, and other equivalent embodiments.

What is claimed is:

1. A multi-function portable illuminating device, comprising:
a housing;
a source of electrical power disposed in said housing:
solar-cell means disposed within said housing for generating a recharging current;
means coupled to said source of electrical power for supplying thereto the charging current generated by said solar cell means;
plural illuminating lamps disposed within said housing including a first light and a strobe light;
selector means for selecting one of said illuminating lamps to be energized;
first switch means for connecting said first light to said source of electrical power;
a strobe circuit coupled to said strobe light;
oscillating means coupled to said strobe circuit for supplying AC power thereto; and
second switch means for connecting said oscillating means to said source of electrical power.

2. The device of claim 1 wherein said plural illuminating lamps comprise a spotlight, a fluorescent tube and a strobe light.

3. The device of claim 2 wherein said first switch means connects said spotlight to said source of electrical power; and further comprising means for selectively coupling said oscillating means to said fluorescent tube for supplying AC power thereto.

4. The device of claim 1 wherein said first light comprises a spotlight.

5. The device of claim 1 wherein said first light comprises a fluorescent tube.

6. A multi-function portable illuminating device comprising:
a housing;

electrical storage battery means disposed within said housing;

plural illuminating lamps, including a spotlight, a fluorescent light and a strobe light, all disposed within said housing:

selector means mounted on said housing and including plural selector switches, a respective one of which being actuated by manual operation of said selector means; and circuit means disposed within said housing and connected to said battery means by the actuation of a respective selector switch to supply electrical energy to said fluorescent light, said spotlight and said strobe light, respectively, said circuit means including AC generating means energized by said battery means when connected thereto by a respective selector switch for generating AC power; the generated AC power being applied to said fluorescent light or to said strobe light as a function of particular selector switches which are actuated.

7. A multi-function portable illuminating device comprising:

a housing;

electrical storage battery means disposed within said housing:

plural illuminating lamps, including a spotlight, a fluorescent light and a strobe light, all disposed within said housing:

selector means mounted on said housing and including plural selector switches, a respective one of which being actuated by manual operation of said selector means;

circuit means disposed within said housing and connected to said battery means by the actuation of a respective selector switch to supply electrical energy to said fluorescent light, said spotlight and said strobe light, respectively; and battery check means for sensing the power operating level of said battery means and including indicating means for providing a visual illuminated indication thereof, said battery check means being connected to said battery means when a predetermined selector switch is actuated.

8. The device of claim 7 wherein said battery check means comprises a differential amplifier having inverting and non-inverting inputs and an output, a first circuit connected to said battery means and having an output coupled to one of the inputs of said differential amplifier for applying a first signal thereto, a second circuit connected to said battery means and having an output connected to the other input of said differential amplifier for applying a second signal thereto, said differential amplifier producing at the output thereof a signal level determined by the difference between said first and second signals, and indicator means connected to the output of said differential amplifier and selectively energized by the output signal produced by said differential amplifier to provide an indication of the power operating level of said battery means.

9. The device of claim 8 wheren said indicator means comprises first and second indicators, one of which is energized when said first signal exceeds said second signal and the other of which is energized when said second signal exceeds said first signal.

* * * * *